United States Patent [19]
Hara et al.

[11] Patent Number: 5,178,708
[45] Date of Patent: Jan. 12, 1993

[54] METHOD FOR PRODUCING MULTI-LAYER MOLDED ARTICLE

[75] Inventors: Takahisa Hara, Kawanishi; Masahito Matsumoto, Ibaraki; Nobuhiro Usui, Takatsuki; Shigeyoshi Matubara, Osaka, all of Japan

[73] Assignee: Sumitomo Chemical Co., Ltd., Osaka, Japan

[21] Appl. No.: 820,374

[22] Filed: Jan. 14, 1992

[30] Foreign Application Priority Data

Jan. 14, 1991 [JP] Japan .................................. 3-2621

[51] Int. Cl.⁵ ............................................. B29C 43/04
[52] U.S. Cl. ................................. 156/242; 156/62.8; 156/245; 156/276; 264/112; 264/119; 264/120; 264/123; 264/124; 264/257; 264/259; 264/275
[58] Field of Search ................ 156/62.2, 62.8, 27.8, 156/242, 245, 307.4, 276; 264/112, 119, 120, 123, 124, 257, 259, 275

[56] References Cited

U.S. PATENT DOCUMENTS

| | | | |
|---|---|---|---|
| 1,244,676 | 10/1917 | Wilcox | 156/245 |
| 3,423,267 | 1/1969 | Munk | 264/120 |
| 3,816,208 | 6/1974 | Gottlieb | 156/245 |
| 4,504,347 | 3/1985 | Munk et al. | 156/62.8 |

FOREIGN PATENT DOCUMENTS

| | | |
|---|---|---|
| 0186015 | 7/1986 | European Pat. Off. . |
| 0333198 | 9/1989 | European Pat. Off. . |
| 833118 | 3/1952 | Fed. Rep. of Germany . |
| 60-141524 | 11/1985 | Japan . |

*Primary Examiner*—Caleb Weston
*Attorney, Agent, or Firm*—Birch, Stewart, Kolasch & Birch

[57] ABSTRACT

A multi-layer molded article including a fiber-reinforced resin sheet and a skin material laminated thereon and having improved appearance is produced by placing a preheated fiber-reinforced resin sheet on a lower mold of a press-molding mold having a sliding frame which vertically moves around an outer periphery of the lower mold, placing a skin material over the placed fiber-reinforced resin sheet and the sliding frame, then lowering an upper mold of the press-molding mold to hold a periphery of the skin material between the sliding frame and the upper mold, further lowering the upper mold to press and adhere the fiber-reinforced resin sheet and the skin material.

4 Claims, 1 Drawing Sheet

METHOD FOR PRODUCING MULTI-LAYER MOLDED ARTICLE

BACKGROUND OF THE INVENTION

1. Field of the Invention

The present invention relates to a method for producing a multi-layer molded article comprising a fiber-reinforced thermoplastic resin body and a skin material which is laminated on a surface of the thermoplastic resin body.

2. Description of the Related Art

A molded article which is produced by press molding a fiber-reinforced resin sheet is excellent in strength. In particular, a glass fiber-reinforced resin sheet has a large reinforcing effect and an economical advantage and it is used in a field where large strength is required, for example, as automobile parts. However, the fiber-reinforced resin sheet generally has a poor appearance and lacks a soft feeling. To improve such drawbacks, it has been proposed to provide a multi-layer molded article comprising a fiber-reinforced resin sheet and a skin material which is laminated thereon. Conventionally, such a multi-layer molded article is produced by adhering the skin layer to the fiber-reinforced resin sheet with an adhesive or by integrating a core material made of a fiber-reinforced resin sheet and a skin material by supplying a foamable resin such as a polyurethane resin between them and blowing it.

However, the conventional methods for producing the multi-layer molded article comprising the fiber-reinforced resin sheet and the skin material include a large number of process steps and require high costs.

SUMMARY OF THE INVENTION

One object of the present invention is to provide a method for producing a multi-layer molded article having a good appearance and soft feeling.

Another object of the present invention is to provide a method for producing a multi-layer molded article by a smaller number of process steps.

According to the present invention, there is provided a method for producing a multi-layer molded article comprising a fiber-reinforced resin sheet and a skin material laminated thereon, which method comprises steps of:

placing a preheated fiber-reinforced resin sheet (6) on a lower mold (2) of a press-molding mold having a sliding frame (3) which vertically moves around an outer periphery of the lower mold (2), placing a skin material (7) over said placed fiber-reinforced resin sheet (6) and said sliding frame (3), then lowering an upper mold (1) of said press-molding mold to hold a periphery of said skin material (7) between said sliding frame (3) and said upper mold (1), further lowering said upper mold (1) to press and adhere said fiber-reinforced resin sheet (6) and said skin material (7) to form said multi-layer molded article.

DETAILED DESCRIPTION OF THE INVENTION

Specific examples of the fiber-reinforced resin sheet to be used in the present invention are fiber-reinforced thermoplastic resins (e.g. polypropylene, polyamide, etc.). Examples of the reinforcing fibers are inorganic fibers (e.g. glass fibers, carbon fibers, stainless steel fibers, etc.), organic fibers (e.g. polyamide fibers, polyester fibers, aramid fibers, etc.) and a mixture of the inorganic and organic fibers. Usually, a diameter of a fiber is from 1 to 50 μm.

Among them, the glass fiber is preferred since it achieves a high reinforcing effect at a low cost.

A preferred fiber-reinforced resin sheet is a sheet obtained by impregnating a mat-form material or a nonwoven fabric of long glass fibers with a molten thermoplastic resin such as polypropylene or polyamide, a sheet obtained by mixing middle length (several to 50 mm) glass fibers and a powdery thermoplastic resin such as polypropylene and heating, melting and processing the mixture, and a mat-form sheet obtained by mixing the middle-length glass fibers and the powdery thermoplastic resin and adding an adhesive to the mixture to adhere them together.

Specific examples of the skin material are a sheet of a thermoplastic elastomer such as an olefin base thermoplastic elastomer or a styrene base thermoplastic elastomer, a sheet of a soft vinyl chloride resin, and a sheet of a low density polyethylene. Among them, the olefin base thermoplastic elastomer sheet is preferred since it is easily embossed, gives soft feeling and has good heat resistance.

The skin material may be decorated by embossing its surface or laminating a woven or non-woven fabric thereon. In may be possible to laminate a foam sheet of polypropylene, polyethylene or polyurethane on a rear surface of the skin material to impart soft feeling to the molded article. Further, the skin material may be lined with a fabric to reinforce the skin material and/or to improve adhesion of the skin material to the fiber-reinforced resin sheet.

Now, the process of the present invention is explained by making reference to the accompanying drawings.

Figure 1A:
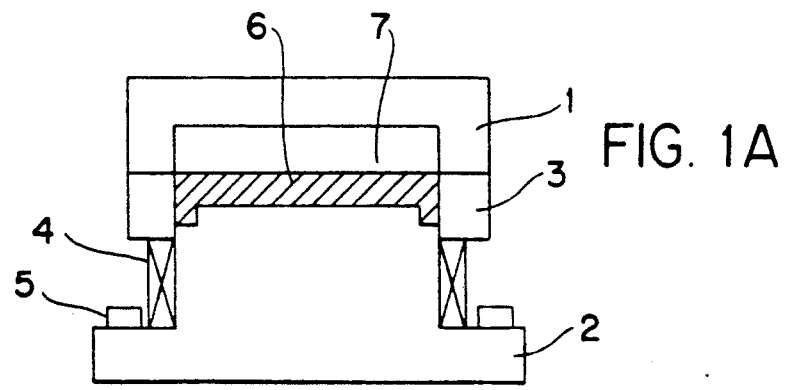
FIGS. 1A, 1B and 1C are vertical cross sectional views of the molding apparatus used in the method of the present invention in various steps.

As shown in FIG. 1A, a fiber-reinforced resin sheet (6) which has been preheated outside a mold is placed on a lower mold (2). A preheating temperature is selected so that the fiber-reinforced resin sheet (6) is easily handled, and the resin flows to and fills edges of a mold cavity when it is press molded.

In some cases, the fiber-reinforced resin sheet used in the present invention expands and its thickness increases when it is heated to a temperature suitable for molding. For example, when the glass fiber-reinforced polypropylene resin sheet having a thickness of 2 mm is prepared by mixing the middle-length glass fibers and the powdery polypropylene and forming the sheet by a wet paper making method and heated at 235° C., its thickness increases to 6 mm or larger. The preheating temperature varies with the kind of the resin used in the fiber-reinforced resin sheet. In case of the fiber-reinforced polypropylene resin sheet, the preheating temperature is usually from 200° to 250° C. When it is lower than 200° C., its molding is difficult. When it is higher than 250° C., the handling of the sheet is difficult and further the resin sheet may be discolored or the skin material may be damaged.

Though the fiber-reinforced resin sheet expands when heated, it can be compressed to the original thickness by pressing, and its flowability in the mold is small. Therefore, to produce the molded article which is more bulky than the unheated fiber-reinforced resin sheet, it is necessary to place the fiber-reinforced resin sheet over almost all the surface of the lower mold. Otherwise, parts which are not filled with the resin tend to appear.

Figure 1B:
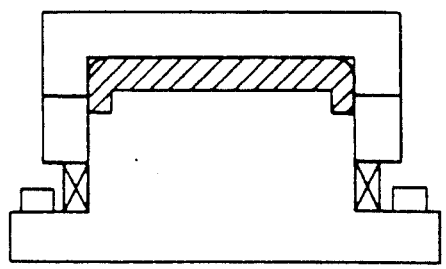

The skin material (7) is placed on the fiber-reinforced resin sheet (6), then an upper mold (1) is lowered to hold the periphery of the skin material (7) between the upper mold (1) and the sliding frame (3) (FIG. 1A). When the mold is further lowered (FIG. 1B), the resin of the sheet (6) which is present at cavity edges between the upper and lower molds (1,2) tends to flow out of the cavity. To prevent this, a gap between the upper mold (2) and the sliding frame (3) in the horizontal direction is made as small as 0.05 to 0.5 mm according to a viscosity of the resin in order to prevent the flowing out of the resin and the formation of burrs.

Figure 1C:
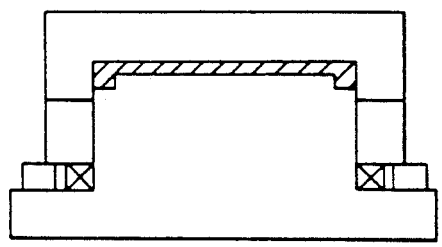

When the upper mold (1) is further lowered, the periphery of the skin material is held between the outer surface of the lower mold (2) and the inner surface of the upper mold (1) (FIG. 1C). In this step, a clearance between the outer surface of the lower mold (2) and the inner surface of the upper mold (1) should be selected by taking the thickness of the skin material into consideration in order that the skin material (7) is not broken, the resin of the fiber-reinforced resin sheet does not flow out, and a suitable area of the skin material (7) slides in the cavity. Generally, the clearance between the peripheral surface of the lower mold (2) and the inner surface of the upper mold (1) is from 0.05 to 0.5 mm.

To laminate the skin material (7) on the fiber-reinforced resin sheet (6) without the formation of wrinkles or breakage, the skin material is stretched and a part of the skin material slides in the cavity. When an amount of the slid-in part of the skin material is too large, wrinkles are formed on the skin material. When this amount is too small, the skin material is torn or excessively stretched. As the result, when the skin material is an embossed leather sheet, the emboss disappears. The amount of the slid-in part of the skin material can be adjusted by controlling the force for holding the skin material between the upper mold (1) and the sliding frame (3) which is moved by driving means (4). The holding force is usually from 0.1 to 10 kg/cm$^2$.

By further lowering the upper mold (1) to close the mold, the fiber-reinforced resin sheet is flowed to fill the cavity edges and to finish the molding.

An expansion ratio is defined as a ratio of the volume of the fiber-reinforced resin sheet after molding (B) to the volume of the fiber-reinforced resin sheet before preheating (A) and can be controlled by adjusting a height of a stopper (5).

PREFERRED EMBODIMENTS OF THE INVENTION

The method of the present invention will be illustrated by the following Examples, which do not limit the scope of the invention.

EXAMPLE 1

Figure 2:
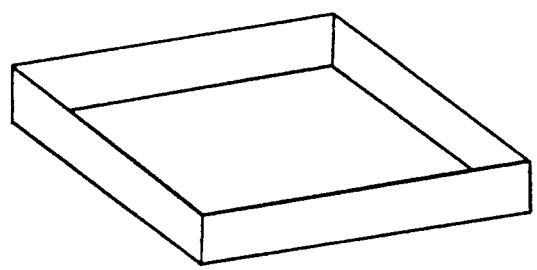
FIG. 2 is a perspective view of the multi-layer molded article produced by the method of the present invention.

A vertical press molding machine with a mold locking force of 100 tons was used, and the upper and lower molds were attached to upper and lower platens, the former of which is vertically moved. A box-shaped molded article of FIG. 2 (300 mm in length, 300 mm in width, 10 mm in height) was molded under the following conditions:

As the fiber-reinforced resin sheet, a polypropylene resin sheet reinforced with 30% by weight of middle-length glass fiber having a length of 10 to 50 mm which had a thickness of 2 mm and prepared by a wet paper making method (manufactured by K-Pla Sheet Co., Ltd.) was used.

This sheet was heated in an oven maintained at 340° C. for 2 minutes and 40 seconds to preheat it at 235° C. and placed on the lower mold (2) as shown in FIG. 1A. Over the sheet (6), as a skin material (7), an embossed vinyl chloride resin sheet having a thickness of 0.7 mm and lined with a stretchable fabric was placed, and the upper mold (1) was lowered to hold the periphery of the skin material between the upper mold (1) and the sliding frame (3) at a holding force of 3 kg/cm$^2$ (FIG. 1A). During this step, temperatures of the upper and lower molds were kept at 80° C. and 60° C., respectively. A horizontal gap between the upper and lower molds (2) and (3) was 0.08 mm.

The upper mold (1) was further lowered and stopped when the clearance between the upper and lower molds reached 5.7 mm. With this clearance, the molds were pressed and cooled at 100 tons for 150 seconds to finish molding and obtain a box-shaped molded article.

A thickness of the flat (bottom) part of the molded article was 5.7 mm and the expansion ratio of the glass fiber-reinforced polypropylene sheet (6) was about 2.5. The molded article having the laminated skin material with a beautiful embossed surface was produced.

EXAMPLE 2

In the same manner as in Example 1 except that the lowering of the upper mold was stopped when the clearance reached 2.7 mm, a box-shaped molded article was produced.

A thickness of the flat part of the molded article was 2.7 mm and the glass fiber-reinforced polypropylene sheet (6) was substantially not foamed. The molded article having the laminated skin material with a beautiful embossed surface was produced.

EXAMPLE 3

In the same manner as in Example 1 except that the lowering of the upper mold was stopped when the clearance reached 3.7 mm, a box-shaped molded article was produced.

A thickness of the flat part of the molded article was 3.7 mm and the expansion ratio of the glass fiber-reinforced polypropylene sheet (6) was about 1.5. The molded article having the laminated skin material with a beautiful embossed surface was produced.

EXAMPLE 4

In the same manner as in Example 1 except using a polypropylene resin sheet reinforced with 60% by weight of middle-length glass fiber having a length of 10 to 50 mm which had a thickness of 2.0 mm and was prepared by a wet paper making method (manufactured by K-Pla Sheet Co., Ltd.), a box-shaped molded article was produced.

A thickness of the flat part of the molded article was 5.7 mm and the expansion ratio of the glass fiber-reinforced polypropylene sheet (6) was about 2.5. The molded article having the laminated skin material with a beautiful embossed surface was produced.

EXAMPLE 5

In the same manner as in Example 1 except using a glass fiber-reinforced polypropylene resin sheet of 3.0 in thickness which contained 30% by weight of the glass fiber and was prepared by impregnating a glass mat of long glass fibers with polypropylene glass fiber, a box-shaped molded article was produced.

A thickness of the flat part of the molded article was 5.7 mm and the expansion ratio of the glass fiber-reinforced polypropylene sheet (6) was about 1.7. The molded article having the laminated skin material with a beautiful embossed surface was produced.

By the process of the present invention, the laminated molded article having the skin material with no wrinkle or breakage can be produced. Such an article is useful as an automobile part or a casing of a light electric appliance.

EXAMPLE 6

In the same manner as in Example 1 except that the lowering of the upper mold was stopped when the clearance reached 2.2 mm, a box-shaped molded article was produced.

The article had a good appearance as in Example 1.

Comparative Example 1

In the same manner as in Example 1 except that the peripheral edge of the skin material was held between the upper mold (1) and the sliding frame (3) under a force of 30 kg/cm², a box-shaped molded article was produced.

The depth of the embosses at the corners was made shallow.

Comparative Example 2

In the same manner as in Example 1 except that the gap between the upper mold (1) and the sliding frame (3) in the horizontal direction was 0.7 mm, a box-shaped molded article was produced.

The article had burrs at the edges.

Comparative Example 3

In the same manner as in Example 1 except that the sliding frame was removed, a box-shaped molded article was produced.

Parts of the skin material at the corners were wrinkled.

What is claimed is:

1. A method for producing a multi-layer molded article comprising a fiber-reinforced resin sheet and a skin material laminated thereon, which method comprises steps of:

placing a preheated fiber-reinforced resin sheet on a lower mold of a press-molding mold having a sliding frame which vertically moves around an outer periphery of the lower mold;

placing a skin material over said placed fiber-reinforced resin sheet and said sliding frame;

then lowering an upper mold of said press-molding mold to hold a periphery of said skin material between said sliding frame and said upper mold;

further lowering said upper mold to press and adhere said fiber-reinforced resin sheet and said skin material to form said multi-layer molded article.

2. The method according to claim 1, wherein a peripheral part of said skin material is held between said sliding frame (1) and said upper mold (1) by a pressure of from 0.1 to 10 kg/cm².

3. The method according to claim 1, wherein a gap in a horizontal direction between said lower mold and said sliding frame is from 0.05 to 0.5 mm.

4. The method according to claim 1, wherein said fiber-reinforced resin sheet contains 15 to 60% by weight of glass fibers having a length of 5 to 50 mm.

* * * * *